United States Patent
Gleyal-Martinez

(10) Patent No.: US 12,337,768 B2
(45) Date of Patent: Jun. 24, 2025

(54) ADHESIVE RESINS AND FILMS FOR COMPOSITES AND TAPES AND METHODS OF USING THE SAME

(71) Applicant: Zephyros, Inc., Romeo, MI (US)

(72) Inventor: Sylvain Gleyal-Martinez, Rochester, MI (US)

(73) Assignee: ZEPHYROS, INC., Romeo, MI (US)

( * ) Notice: Subject to any disclaimer, the term of this patent is extended or adjusted under 35 U.S.C. 154(b) by 1048 days.

(21) Appl. No.: 15/779,192

(22) PCT Filed: Nov. 30, 2016

(86) PCT No.: PCT/US2016/064199
§ 371 (c)(1),
(2) Date: May 25, 2018

(87) PCT Pub. No.: WO2017/095912
PCT Pub. Date: Jun. 8, 2017

(65) Prior Publication Data
US 2021/0197737 A1 Jul. 1, 2021

Related U.S. Application Data

(60) Provisional application No. 62/260,976, filed on Nov. 30, 2015.

(51) Int. Cl.
| | | |
|---|---|---|
| B32B 3/10 | (2006.01) | |
| B32B 7/12 | (2006.01) | |
| B60R 13/02 | (2006.01) | |
| C09J 7/35 | (2018.01) | |
| C09J 163/00 | (2006.01) | |

(52) U.S. Cl.
CPC ............... *B60R 13/02* (2013.01); *B32B 7/12* (2013.01); *C09J 7/35* (2018.01); *C09J 163/00* (2013.01); *B32B 2260/021* (2013.01); *B32B 2260/046* (2013.01); *B32B 2605/003* (2013.01); *B32B 2605/08* (2013.01)

(58) Field of Classification Search
None
See application file for complete search history.

(56) References Cited

U.S. PATENT DOCUMENTS

| | | | |
|---|---|---|---|
| 4,647,648 A | 3/1987 | Silvis | |
| 8,702,889 B2 | 4/2014 | Sheasley et al. | |
| 9,157,013 B2 | 10/2015 | Czaplicki | |
| 9,394,468 B2 | 7/2016 | Czaplicki et al. | |
| 9,586,363 B2 | 3/2017 | Siboni et al. | |
| 9,683,149 B2 | 6/2017 | Czaplicki | |
| 9,796,891 B2 | 10/2017 | Gleyal et al. | |
| 10,137,676 B2 | 11/2018 | Siboni et al. | |
| 10,421,260 B2 | 9/2019 | Richardson et al. | |
| 10,570,258 B2 | 2/2020 | Richardson et al. | |
| 10,577,522 B2 | 3/2020 | Awkal et al. | |
| 10,577,523 B2 | 3/2020 | Miller et al. | |
| 10,689,784 B2 | 6/2020 | Siboni et al. | |
| 10,718,086 B2 | 7/2020 | Braymand et al. | |
| 11,052,632 B2 | 7/2021 | Apfel et al. | |
| 11,124,678 B2 | 9/2021 | Chopin | |
| 11,248,145 B2 | 2/2022 | Czaplicki | |
| 2007/0027233 A1* | 2/2007 | Yamaguchi | C08L 63/00 523/467 |
| 2007/0270515 A1 | 11/2007 | Chmielewski | |
| 2015/0096663 A1* | 4/2015 | Siboni | C09J 163/00 156/330 |
| 2015/0096678 A1* | 4/2015 | Siboni | B32B 7/02 156/293 |
| 2016/0046047 A1 | 2/2016 | Gleyal et al. | |
| 2016/0229965 A1 | 8/2016 | Chmielewski et al. | |
| 2018/0036970 A1 | 2/2018 | Chmielewski et al. | |
| 2018/0326659 A1 | 11/2018 | Gleyal-Martinez | |
| 2020/0157293 A1 | 5/2020 | Chmielewski | |
| 2020/0164602 A1 | 5/2020 | Hursit et al. | |
| 2021/0197737 A1 | 7/2021 | Gleyal-Martinez | |
| 2021/0277295 A1 | 9/2021 | Fezzey et al. | |
| 2021/0301072 A1 | 9/2021 | Czaplicki et al. | |
| 2021/0310157 A1 | 10/2021 | Walker | |
| 2021/0380755 A1 | 12/2021 | Kosal et al. | |
| 2022/0010175 A1 | 1/2022 | Czaplicki et al. | |

FOREIGN PATENT DOCUMENTS

| | | | | |
|---|---|---|---|---|
| CN | 101646706 A | | 2/2010 | |
| CN | 101728414 A | | 6/2010 | |
| CN | 103068570 A | | 4/2013 | |
| CN | 101351333 B | * | 7/2013 | ....... B29C 45/14811 |
| EP | 3268201 A1 | | 1/2018 | |
| EP | 3268217 A1 | | 1/2018 | |
| GB | 765513 A | | 1/1957 | |
| JP | 2007301774 A | | 5/2008 | |
| WO | 2008010823 A2 | | 1/2008 | |
| WO | 2016/025787 A1 | | 2/2016 | |

(Continued)

OTHER PUBLICATIONS

Machine translation of CN-101351333-B (Year: 2013).*
Chinese First Office Action dated Oct. 12, 2020, Application No. 201680069824.1.
India First Examination Report Dated Oct. 28, 2020, Application No. 201817019037.
Anonymous: "A Reformable Epoxy Adhesive Film", JEC Group, Oct. 20, 2014, XP055353197, Retrieved from the Internet: URL:http://www.jeccomposites.com/knowledge/international-composites-news/reformable-epoxy-adhesive-film [retrieved on Mar. 9, 2017] the whole document.
PCT Search Report & Written Opinion dated Mar. 27, 2017, Application No. PCT/US2016/064199.
European Communication dated Jul. 20, 2020, Application No. 16822556.3.

(Continued)

*Primary Examiner* — Christopher M Polley
(74) *Attorney, Agent, or Firm* — The Dobrusin Law Firm, P.C.

(57) ABSTRACT

Reformable epoxy resins are disclosed for use in films, composites, and tapes and more particularly for uses of such materials for reinforcing, surface treating, adhering, laminating and stiffening.

17 Claims, No Drawings

(56) References Cited

FOREIGN PATENT DOCUMENTS

| WO | WO-2016055535 A1 * | 4/2016 | ........... C08G 59/186 |
| WO | 2017083690 A1 | 5/2017 | |

OTHER PUBLICATIONS

U.S. Appl. No. 10/570,258, filed Feb. 25, 2020, Richardson et al.
U.S. Appl. No. 11/155,673, filed Oct. 26, 2021, Mazich et al.
Chinese Office Action dated Jul. 12, 2023, Application No. 202111250921.X.
European Patent Office Communication dated May 4, 2023, Application No. 16822556.3.
European Communication dated Mar. 11, 2025 (application No. 16822556.3-1102).

* cited by examiner

ADHESIVE RESINS AND FILMS FOR COMPOSITES AND TAPES AND METHODS OF USING THE SAME

TECHNICAL FIELD

The present teachings pertain generally to reformable epoxy resins for use in films, composites, and tapes and more particularly to uses of such materials for reinforcing, surface treating, adhering, laminating and stiffening.

BACKGROUND

The use of epoxy-based adhesives is common in a wide variety of industries including building construction, sporting equipment, furniture, automotive, train, aerospace (and other transportation vehicles) among others. However, such adhesives are generally thermoset adhesives. Thermoplastic adhesives are also known, but do not have the strength characteristics of epoxy-based materials. It is also common to use composite structures in these industries due to their high strength and the variety of materials that can be utilized for the various composite layers. However, the use of thermoset adhesives in forming such composites often present significant limitations on the ability to curve, mold and form composite structures having both sufficient strength and sufficient cohesion.

Further to the above, thermoplastic polymers having at least one epoxide group have been described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

There is thus a need for reformable (e.g., non-thermoset) epoxy-based adhesives that are easily formed into a wide variety of formats, require minimal time and heat to soften and adhere, and yet maintain the high strength of typical epoxy-based thermoset adhesives.

SUMMARY OF THE INVENTION

The teachings herein are directed to a variety of formats and uses for reformable epoxy resin adhesives. As one example, the teachings herein provide for an interior trim for a vehicle comprising an insert having a first profile shape and a reformable epoxy resin adhesive film located in direct planar contact with the insert. The adhesive film has a glass transition temperature higher than room temperature but lower than 200° C. and upon exposure to temperatures at or above its glass transition temperature, the adhesive film bonds the insert to a vehicle interior and the insert is free of any mechanical fastener for attaching the insert to the vehicle interior. It is also possible that the insert, or a portion of the vehicle interior to which the insert is bonded, is metallic. Thus, induction heating could be utilized to activate the film. It is also possible the film itself includes a metallic component, also allowing for induction heating.

The teachings herein also provide for a method for reinforcing a structure comprising forming a reformable epoxy resin adhesive tape, locating the adhesive tape into a dispensing device and simultaneously dispensing and heating the adhesive tape. The tape may be dispensed onto a surface requiring reinforcement and the method is free of any welding steps.

The teachings herein are also directed to a stiffening system for a vehicle comprising a panel that includes a first surface that will be viewable on the exterior of a vehicle and a material including a reformable epoxy resin adhesive located onto a second surface of the panel. The adhesive may have an elongation of at least about 30%, or even at least about 40%, such that upon exposure to temperatures above the glass transition temperature of the adhesive and subsequent exposure to room temperature, the presence of the adhesive will not be visible on the first surface.

The teachings herein further envision a method for treating metallic materials comprising locating a reformable epoxy resin film in direct planar contact with a metallic surface so that and adhesion and weldability are improved.

The teachings herein also provide for a method for manufacture of a sheet molding compound comprising providing a reformable epoxy resin film adhesive and locating a plurality of sheet molding compound layers into contact with the film adhesive so that the film adhesive holds the plurality of layers together during manufacture. The method may be free of any step of removing the adhesive film and may optionally include a step of printing directly onto the adhesive film.

The teachings herein also provide for a method for forming an interior portion of a vehicle comprising providing a first fibrous layer having a first profile shape, locating a reformable epoxy resin adhesive into direct planar contact with the first fibrous layer, and molding the first fibrous layer and adhesive into a second profile shape with the application of heat. Also envisioned is a composite panel for use in a wall, floor or ceiling of a commercial vehicle, wherein the composite panel includes a layer of reformable epoxy resin adhesive which allows for forming and re-forming the panels.

The reformable epoxy resin adhesive may have a glass transition a glass transition temperature ($T_g$) as measured by differential scanning calorimetry according to ASTM E1356-08(2014) of from about 60° to about 90° (e.g., about 80° C.). The reformable epoxy resin adhesive may have a glass transition a glass transition temperature ($T_g$) as measured by differential scanning calorimetry according to ASTM E1356-08(2014) of greater than about 90° C., about 100° C., about 110° C., or about 120° C. The reformable epoxy resin adhesive may be a thermoplastic condensation reaction product of a reaction of a mono-functional or di-functional species with an epoxide-containing moiety reacted under conditions for causing the hydroxyl moieties to react with the epoxy moieties to form a generally linear backbone polymer chain with ether linkages. The reformable epoxy resin adhesive may be activated by any stimulus that raises the temperature of the adhesive at or above its glass transition temperature. The reformable epoxy resin adhesive may be formed as a pellet prior to use. The reformable epoxy resin adhesive may be applied by a robotic arm device. The reformable epoxy resin adhesive may be formed as a pellet prior to use and then heated in a dispensing device. The reformable epoxy resin adhesive may be located onto or impregnated within one or more fibrous layers.

DETAILED DESCRIPTION

The present teachings meet one or more of the above needs by the improved composite structures and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/260,976, filed Nov. 30, 2015, the entirety of the contents of that application being hereby incorporated by reference for all purposes.

The teachings herein make advantageous use of a reformable epoxy resin epoxy adhesive that hardens and adheres when it cools. The teachings herein contemplate a method for providing structures that are formable and moldable after the reformable epoxy resin material is heated and subsequently falls below its glass transition temperature. The reformable epoxy resin adhesive provides structural toughness associated with epoxy materials, but is amenable to molding and re-molding after cure unlike other epoxy-based adhesive materials. Thermoplastic films are known in the art of composite structure formation, but such films typically fail to provide sufficient adhesion and stiffness. Reformable epoxy resin adhesives for use in the structures described herein provide additional stiffness, adhesion and allow for reforming and are therefore useful for composites that are formed to have curved profiles.

The reformable epoxy resin material described herein may fall below its glass transition temperature upon exposure to ambient temperature in less than 5 minutes. After the reformable epoxy resin material falls below its glass transition temperature, it may be heated multiple times above its glass transition temperature for molding into a shape that differs from an original shape. The reformable epoxy resin material may fail below its glass transition temperature upon exposure to ambient temperature. The adhesive film may be used in combination with an embedded material to act as an insulator. The embedded material may be a fibrous material such as a fleece or fabric.

The adhesive film may be applied to a decorative trim piece (e.g., an insert), which may be made of wood, a wood veneer or of a carbon material. The adhesive film may be applied in between the decorative trim and a vehicle interior. The adhesive film may allow for connecting the trim piece, or any other piece to which the trim piece is adhered, to the vehicle interior. Such connection may occur in the absence of any additional fasteners. Such trim pieces may be applied directly to a vehicle dashboard without the need for additional fasteners. The trim piece, the substrate to which the trim piece is attached, or the film itself, may have a metallic component. The metallic component may thus facilitate induction heating of the film.

The film may have characteristics and components similar to those disclosed in PCT Publication No. WO2016/130180, the contents of this publication being hereby incorporated by reference for all purposes.

The reformable epoxy resin adhesive may be formed into a tape or similar composite structure to provide reinforcement at certain points along a vehicle body that would traditionally be reinforced with brackets. For example, front and rear vehicle seats may utilize brackets, which are typically welded onto areas of the seats requiring reinforcement. As an alternative to the brackets, composite tapes comprising the resin adhesives disclosed herein could be applied at these locations, thus removing the need for brackets and/or welding steps.

The tape may be applied in an automated manner such that the tape is simultaneously applied, heated, and pressed onto a surface requiring reinforcement. The tape may be applied by a robot. Fibers (e.g., glass, carbon, or fibrous) may be formed in the tape to provide additional reinforcing support as needed.

The resin adhesives described herein may be used on the underside of or adjacent to typical "Class A" vehicle surfaces. Many adhesives experience shrinking post-cure which is visible along the viewable exterior of a vehicle panel (e.g., read-through). Often, there is a difference between the coefficient of expansion of a vehicle panel as opposed to that of the materials applied to and/or in contact with the panel. The adhesives described herein may have a significant elongation (e.g., an elongation of greater than about 20%, greater than about 30%, or even greater than about 40%) such that the adhesive absorbs stress and thus does not shrink. Accordingly, the exterior surface of the vehicle shows no visible effect of the presence of the adhesive.

The use of the adhesives described herein as metallic coatings may promote improved adhesion of the metal, even after an ageing process. The adhesives provided for herein may further improve the weldability of such metallic materials.

The adhesives described herein may also be utilized in applications where adhesive films are used on a temporary basis to hold structures in place during assembly. Upon application of heat, the adhesives may effectively blend into certain materials (for example, a sheet molding compound or "SMC" material), thus eliminating the need to remove the film when manufacturing is complete. Further, the adhesives may be utilized in combination with fibrous materials that are common in vehicle interiors to form moldable composite structures that have a three-dimensional shape. The nature of the adhesives is such that they can be applied as a film to a base material and then easily and quickly molded to a desired three-dimensional shape. Examples include seats, floors, trays, counsels and the like.

The reformable resin adhesive films allow for printing directly onto the film and can thus be applied to a visible surface with desired print material already located on the film. Alternatively, the film can receive print after being applied to a desired surface.

The materials and methods taught herein include possible uses for reformable epoxy resin (RER) materials. It is possible that the RER materials may be provided initially in a pellet form and then formed into an RER film.

Typically, the use of epoxy-based adhesives provides for composite materials that can endure minimal curving based on the relatively brittle nature of the epoxy adhesives. As a result, the amount of curving that a composite structure can withstand without cohesive failure is controlled by the adhesive. However, the amount of curving that a composite structure can withstand when formed with the adhesives described herein is controlled by the material layers that receive the adhesive.

An advantage of the present teachings over existing epoxy materials used for adhesives is that the materials herein have improved strength and adhesion as compared to other thermoplastic materials and are also significantly more flexible than other epoxy-based adhesives. Further, the RER adhesive can be easily and selectively removed and reformed by the addition of heat. Additional benefits of the RER material include fast hardening and adhesion, and also the ability to re-form and re-mold the adhesive. Adhesion, hardening, and returning to a solid state upon cooling of the RER begins almost immediately after heating is stopped and full adhesion can occur within about 10 seconds to about 60 seconds (e.g., about 30 seconds). It is contemplated that allowing the adhesive to return to ambient temperature is sufficient for adhesion, and additional hardening steps are possible, but not necessary. In addition, a reformable epoxy resin may be desirable because of its long shelf life. It also may not require storage at a refrigerated temperature, unlike some alternative materials.

Exemplary RER materials are made using bisphenol A diglycidyl ether (BADGE) and monoethanolamine. For some applications that may require a higher glass transition temperature ($T_g$), it is contemplated that BADGE may be replaced by an epoxy monomer with less mobility. Such epoxy monomers may include diglycidylether of fluorendiphenol or 1,6 napthalene diepoxy. Also, it is contemplated that where fire resistance is desired, BADGE can be replaced by a brominated bisphenol A epoxy resin. The RER material having at least one epoxide group may be hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

Though other functional species may be employed, as is taught in U.S. Pat. No. 6,011,111 (incorporated by reference; see, e.g., Cols. 6-8) and WO 98/14498 (incorporated by reference; see, e.g., pages 8-11) examples of such mono-functional or di-functional species may include a dihydric phenol, a secondary amine (e.g., a bis-secondary amine), a primary amine, or any combination thereof. Any amine of the functional species can be an aromatic amine, an aliphatic amine or a combination thereof. The mono-functional or di-functional species may have one or two functionalities capable of reacting with epoxide groups to form a generally non-cross-Inked polymer. Some particular examples, without limitation, of functional species for reaction with an epoxy moiety in accordance with the present teachings includes an ethanolamine (e.g., monoethanolamine), piperazine or a combination thereof. Any of the illustrative functional species may be substituted or unsubstituted. An example of a diepoxide that can be employed in the teachings includes a diglycidyl ether of a dihydric phenol (e.g., resorcinol, biphenol or bisphenol A). Any epoxide-containing moiety herein may be an aliphatic and/or an aromatic epoxide.

Other examples of illustrative materials, functional species and diepoxides are described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

Approaches other than the above to reactions for making materials useful for the present teachings (e.g., a thermoplastic polyether) may include one or more reactions selected from the above first and second approaches, or (a) a reaction product of diglycidyl ether of a biphenol with a dihydroxybiphenyl, in which the repeating unit of the polyhydroxyether contains a hydrocarbon connecting group and a hydrocarbon or halogen substituted phenylene radical, as described in U.S. Pat. No. 4,647,648 (incorporated by reference); (b) a reaction product of a diglydicyl ether of certain amido-dihydric phenols and N-substituted dihydric phenols, as described in U.S. Pat. No. 5,115,075 (incorporated by reference); (c) a reaction product of a dihydric phenol (e.g., a diglycidyl ether of one or more of bisphenol ketone, bisphenol sulfone, resorcinol, or hydroquinone) and at least one other dihydric phenol such as 4,4'-ispropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, or the like, as described in U.S. Pat. No. 5,164,472 (incorporated by reference); (d) a reaction product (e.g., a reactive extrusion product) of a diglycidyl ether of a dihydric phenol with an amine having only two hydrogens under conditions sufficient to form the polyetheramine, as described in U.S. Pat. No. 5,275,853 (incorporated by reference); (e) a reaction product of dihydric phenol and a diepoxide in the presence of a catalyst selected from bis (trihydrocarbylphosphoranylidene)ammonium salt, bis[tris (dihydrocarbylamino)phosphoranylidene]ammonium salt, or tetrakis[tris(dihydrocarbylamino)phosphoranylideneamino]phosphonium salt, as described in U.S. Pat. No. 5,401,814 (incorporated by reference); (f) a reaction product prepared by reacting (1) a primary amine or bis(secondary) diamine with (2) a diglycidyl ether and (3) an amine- or epoxy-functionalized poly(alkylene oxide), as described in U.S. Pat. No. 5,464,924 (incorporated by reference); (g) a reaction product of a compound having an average of more than one vicinal epoxide group per molecule and a polyhydric phenol or thiophenol, in the presence of a catalytic amount of a tetrahydrocarbyl phosphonium salt in an essentially anhydrous medium, as described in U.S. Pat. No. 4,438,254 (incorporated by reference); (h) a reaction product of a diepoxide (e.g., diglycidyl ethers of dihydric phenols) and a difunctional species selected from dihydric phenols, dicarboxylic acids, bis-secondary amines, primary amines, dithiols, disulfonamides, and compounds that contain two different functionalities capable of reacting with epoxide groups, as described in U.S. Pat. No. 6,011,111 (incorporated by reference); or (i) a hydroxy-phenoxyether reaction product polymer prepared by reacting a difunctional species (that is, a species having two reactive groups), such as a dihydric phenol, with a diepoxide (that is, a compound having two epoxide functionalities) under conditions sufficient to cause the hydroxyl moieties to react with the epoxy moieties to form ether linkages, as described in WO98/14498 (incorporated by reference).

The teachings herein also relate to a method for making a variety of articles. For instance, a method in accordance with the present teachings may employ forming a composite material by extrusion, injection molding, pultrusion, or a combination of both. Thus, it is envisioned for the teachings herein that there is method of making the articles that includes contacting an epoxy/amine reaction product material (e.g., a material that is a reaction product of a diepoxide and a primary amine, such as monoethanolamine) during a step of extrusion, injection molding, pultrusion or any combination thereof. The contacting may be only after the reaction has completed between the epoxy and the amine (e.g., only after the reaction of epoxy and amine). Thus it is possible that the method herein will involve no chemical reaction between any epoxy and amine reactants that occurs with an injection molding machine and/or an extruder. That is, the method may include advancing a thermoplastic polymer having at least one epoxide functional group reaction product along a rotating feed screw within a barrel of a polymeric material shaping apparatus.

While it is envisioned that the adhesive may have a relatively low glass transition temperature, it is also possible that the adhesive is modified to increase the glass transition temperature. It is also possible that the adhesive is modified to improve a physical property of the adhesive. Examples of such modification can be found for example in PCT Application No. PCT/US16/61588, the contents of this application being hereby incorporated by reference herein for all purposes. In more detail, such teachings contemplate a material system, which may relate to one or any combination of a method, a reaction product (which may be a polymer), or a formulated compound including the reaction product. The material system envisions a reaction of at least one diepoxide (as illustrated herein) and at least one bisphenol (as illustrated herein) under conditions (e.g., while maintaining a temperature of the reaction mixture not exceeding about 300° C., and particularly not exceeding about 275° C., about 250° C., about 225° C., or about 200° C. (e.g., it may not exceed about 195° C., about 190° C., 185° C., about 180° C.))) throughout substantially the entire reaction period. For example, the amount of time that any of the reaction mixture exceeds about 200° C. is less than about 30%, about 20% or about 10% of the total reaction time. The reaction time may be the amount of time sufficient to form a reaction product having a $T_g$ as measured by differential scanning calorimetry according to ASTM E1356-08(2014) of at least about 90° C., at least about 100° C., at least about 110° C., or at least about 120° C. The $T_9$ may be below about 200° C., below about 185° or below about 170° C.

The reaction conditions may be such that one or any combination of the conditions of the following paragraphs are met. The reaction product may be a catalyzed reaction product of a mixture consisting essentially of at least one catalyst, at least one diepoxide and at least one bisphenol other than bisphenol S. In this regard, the mixture may be free of any sulfur, any ketone moiety, or free of both sulfur and any ketone moiety. However, as will be seen herein, it is possible that a sulfur-containing bisphenol (e.g., bisphenol S) may be employed (e.g., in a reaction that may be devoid of an iminium catalyst as a major portion of the catalyst, employs insignificant amounts of solvent, or both). Such reaction may also be devoid of any catalyst.

The reaction product may be a catalyzed reaction product of the at least one diepoxide and at least one bisphenol in the presence of a catalyst having no more than about 35% by weight of the total catalyst, no more than about 25% by weight of the total catalyst, or no more than about 15% by weight of the total catalyst, or no more than about 5% by weight of the total catalyst of an iminium catalyst. The reaction product may be a catalyzed reaction product of a mixture consisting essentially of at least one a non-Iminium phosphine catalyst, at least one diepoxide and at least one bisphenol.

The reaction product may be a reaction product of a mixture including at least one diepoxide and at least one bisphenol in the substantial absence of any solvent. For instance, the amount of any solvent (namely, any organic solvent (e.g., an organic solvent other than one of the reactants) that is typically non-reactive with the diepoxide and/or the bisphenol under the reaction conditions herein) present during any reacting steps may be less than about 40, less than about 30, less than about 20, less than about 10, or less than about 5% by weight of a total reaction mixture. The reaction product may be a reaction product of a reaction mixture of at least one diepoxide and at least one bisphenol in the absence of any solvent.

The reaction product may be a catalyzed reaction product of a reaction mixture including, consisting essentially of (e.g., present along with any catalyst in an amount that is greater than about 85, greater than about 90, or greater than about 95 percent of the mixture), or consisting of at least one diepoxide and at least one bisphenol, reacted in the presence of a catalyst having one or a combination of fewer than six phenyl groups, or a single or at least one phosphorus atom in an oxidation state of 3+. For instance, the reaction product may be a catalyzed reaction product of a reaction mixture of at least one diepoxide and at least one bisphenol, reacted in the presence of a catalyst containing an organophosphorus compound (e.g., a non-iminium phosphine) (e.g., at least about 65%, at least about 75%, at least about 85% or at least about 95%, by weight of the total catalyst is an organophosphorus compound (e.g., a non-iminium phosphine)). By way of illustration, without limitation, the reaction product may be a catalyzed reaction product of a reaction mixture consisting essentially (e.g., present in an amount that is greater than about 85, greater than about 90, or greater than about 95 percent of the mixture) of at least one diepoxide, at least one bisphenol, and a catalyst selected from an organophosphorus compound (e.g., a non-iminium phosphine having a molecular weight below about 500 g/mol, such as triphenylphosphine (PPH3)).

For such material system, the at least one diepoxide may be a diglycidyl ether. The at least one diepoxide may be a diglycidyl ether, having at least one substituted or unsubstituted aryl (e.g., phenol) group. The at least one diepoxide may be selected from resorcinol diglycidyl ether, diglycidyl ether of bisphenol A ("DGEBA"), bisphenol F diglycidyl ether, bisphenol A propoxylate diglycidyl ether, or any combination thereof. The material of the present teachings may employ as its at least one bisphenol ingredient a bisphenol that has a molecular weight of about 200 to about 360 g/mol. The at least one bisphenol may be selected from 4,4'-(1-phenylethylidene) bisphenol; 4,4'-sulfonylbisphenol (Bisphenol S); or a combination thereof.

A polymer or other reaction product of the present teachings may have a relatively high $T_g$, as described in preceding passages. It may be possible to have a $T_g$ in excess of 115° C., in excess of 116° C., in excess of 117° C., in excess of 118° C., in excess of 119° C., or in excess of 120° C., as measured by differential scanning calorimetry according to ASTM E1356-08(2014). The polymer and/or reaction product of the present teachings may have a glass transition temperature as measured by differential scanning calorimetry according to ASTM E1356-08(2014) of below about 200° C., below about 185° C., or below about 170° C. The polymer and/or reaction product of the present teachings may have a glass transition temperature as measured by differential scanning calorimetry according to ASTM E1356-08(2014) of at least about 120° C., and below about 170° C.

In addition to having a relatively high $T_g$, the polymer and/or reaction product of the present teachings may also have attractive mechanical properties. For example, the polymer and/or reaction product of the present teachings may exhibit one or any combination of the following characteristics: a stress at break (according to ASTM D638-14) of at least about 60 MPa (e.g., at least about 75 MPa), a tensile elongation at break (according to ASTM D638-14) of at least about 60 (e.g., at least about 75 MPa) and/or a modulus of elasticity (according to ASTM D638-14) of at least about 1 GPa (e.g., at least about 2.7 GPa).

In an effort to achieve such mechanical properties, it is also possible that the material include one or more additives. As one non-limiting example, the material may include an additive to improve (e.g., increase) the toughness of the material. Such toughening agent may include a core shell material. Such core-shell particulates may include an elastomeric core (e.g., a cross-linked rubber core). The elastomeric core, for example, may include butadiene. The elastomeric core may include a copolymer of butadiene and styrene. The elastomeric core may include a polymer having at least one silicon atom (e.g., a silicone rubber). The core shell particulates may include a shell that includes a (meth) acrylic acid, an ester thereof, and or a nitrile thereof. For example, the particulates may include a copolymer, such as a copolymer of styrene, methyl methacrylate, glycidyl methacrylate and optionally acrylonitrile. The core-shell particulates may be dispersed in a liquid suspension medium in a range of concentrations (e.g., from about 5% to about 50%, such as about 10% to about 40% by weight of the total dispersion). The core-shell particulates may be dispersed in a liquid suspension medium that may include a liquid resin, such as an epoxy based resin (e.g., diglycidyl ether of bisphenol A, diglycidyl ether of bisphenol F, a reaction product of one or both with another ingredient (such as epichlorohydrin), or any combination of these materials). Examples of commercially available core-shell particulates include those sold by Kaneka Corporation under the designation Kaneka Kane Ace, (e.g., grade 136 (dispersed as a concentrate in a diglycidyl ether of bisphenol F; and/or grade 156 (dispersed as a concentrate in a diglycidyl ether of bisphenol A). For additional guidance, the teachings of U.S. 2007/0027233 may be employed. The liquid suspension medium may be such that the particulates require no separation therefrom prior to mixing with other reactants. Thus, it is possible that the liquid suspension medium will form part of the reactants to form the resulting materials of the present teachings.

The core shell particulates may be characterized by one or more of their physical characteristics. For example, the particulates may be generally spherical. They may have an average diameter of about 0.01 micrometers to about 1 micrometers (e.g., about 0.05 to 0.2 micrometers), measured by scanning electron microscopy. Thus, the core-shell particles may be of generally nanoparticle sizes.

The core shell particulates may be employed in an amount relative to the total amount of the core shell particulates and the thermoplastic epoxy material of up to about 20 percent by weight, up to about 15 percent by weight, up to about 10 percent by weight. The core shell particulates may be employed in an amount relative to the total amount of the core shell particulates and the thermoplastic epoxy material of at least about 1 percent by weight, at least about 3 percent by weight, or at least about 5 percent by weight. Additional examples describing the use of such core shell particulates can be found in U.S. Provisional Application Ser. No. 62/280,934, filed Jan. 20, 2016 and 62/372,551, filed Aug. 9, 2016, the contents of these applications being hereby incorporated by reference herein for all purposes.

Reformable epoxy resin adhesives are advantageous as they allow for faster hardening and adhesion, thereby reducing the need for extended periods of time and large areas of space for curing adhesives in composite structures. While RER adhesives may be workable at ambient temperature, it is often desirable to have a heat applying step to soften or melt the RER adhesive to allow it to move or become more workable. Heating the resulting structure allows for ease of formability into a desired shaped, which may have a curved profile. Adhesion and hardening of the RER begins almost immediately after heating is stopped and full adhesion can occur within about 10 seconds to about 5 minutes (e.g., about 2 minutes). It is contemplated that allowing the adhesive to return to ambient temperature is sufficient for adhesion, and additional hardening steps are possible, but not necessary. With an RER adhesive, it is also possible that the bond formed between the adhesive and any adjacent substrate can be debonded by increasing the temperature over the glass transition temperature (T) of the RER to allow the bonded substrates to be separated.

As used herein, unless otherwise stated, the teachings envision that any member of a genus (list) may be excluded from the genus; and/or any member of a Markush grouping may be excluded from the grouping. When the use of "a" is employed herein, unless otherwise specified, or it is clear from the text, "a" envisions one or more. Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, Individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and al numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. For example, unless otherwise stated, in the context of the present teachings, a combination described as consisting essentially of any particular elements may permit for the presence of other elements, components, ingredients or steps that do not alter a $T_g$ of a material by +/−3°C as compared with a material without such elements, components, ingredients, or steps. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An interior trim for a vehicle interior comprising:
   i) a vehicle having a vehicle interior;
   ii) an interior trim piece located within the vehicle interior;
   iii) an insert for forming the interior trim piece, the insert having a first profile shape;
   iv) a reformable epoxy resin adhesive disposed on a second surface of interior trim piece impregnated within one or more fibrous layers, the one or more fibrous layers located in direct planar contact with the insert prior to any contact between the insert and vehicle interior, wherein the reformable epoxy resin adhesive that is impregnated one or more fibrous layers also includes a core shell component with a butadiene elastomeric core;
   v) a metallic portion separate from the insert located on or within at least one of the insert, or the fibrous layers;
   vi) a reformable adhesive film disposed on a first surface for the interior trim piece with a desired print material thereon; and
   wherein the adhesive has a glass transition temperature higher than room temperature but lower than 200° C. and upon exposure to temperatures at or above its glass transition temperature, the adhesive bonds the insert and metallic portion to the vehicle interior and the insert is free of any mechanical fastener for attaching the insert to the vehicle interior.

2. The interior trim of claim 1, wherein the reformable epoxy resin adhesive has a glass transition a glass transition temperature ($T_g$) as measured by differential scanning calorimetry according to ASTM E1356-08(2014) of from about 60° to about 90° C.

3. The interior trim of claim 1, wherein the reformable epoxy resin adhesive has a glass transition a glass transition temperature ($T_g$) as measured by differential scanning calorimetry according to ASTM E1356-08(2014) of greater than 90° C.

4. The interior trim of claim 1, wherein the reformable epoxy resin adhesive is a thermoplastic condensation reaction product of a reaction of a mono-functional or di-functional species with an epoxide-containing moiety reacted under conditions for causing the hydroxyl moieties to react with the epoxy moieties to form a generally linear backbone polymer chain with ether linkages.

5. The interior trim of claim 2, wherein the reformable epoxy resin adhesive is a thermoplastic condensation reaction product of a reaction of a mono-functional or di-functional species with an epoxide-containing moiety reacted under conditions for causing the hydroxyl moieties to react with the epoxy moieties to form a generally linear backbone polymer chain with ether linkages.

6. The interior trim of claim 1, wherein the reformable epoxy resin adhesive is formed as a pellet prior to use.

7. The interior trim of claim 5, wherein the reformable epoxy resin adhesive is formed as a pellet prior to use.

8. The interior trim of claim 1, wherein the reformable epoxy resin adhesive is applied by a robotic arm device.

9. The interior trim of claim 7, wherein the reformable epoxy resin adhesive is applied by a robotic arm device.

10. The interior trim of claim 1, where the insert comprises a wood material, a wood veneer material, a carbon material, or some combination thereof.

11. The interior trim of claim 5, where the insert comprises a wood material, a wood veneer material, a carbon material, or some combination thereof.

12. The interior trim of claim 1, where the insert and the one or more fibrous layers impregnated with the reformable epoxy resin adhesive forms a composite which is adapted to be formed to have a curved profile.

13. The interior trim of claim 2, where the insert and the one or more fibrous layers impregnated with the reformable epoxy resin adhesive forms a composite which is adapted to be formed to have a curved profile.

14. The interior trim of claim 1, wherein the one or more fibrous layers impregnated with the reformable epoxy resin adhesive forms a tape material that hardens upon exposure to ambient temperatures.

15. The interior trim of claim 11, wherein the one or more fibrous layers impregnated with the reformable epoxy resin adhesive forms a tape material that hardens upon exposure to ambient temperatures.

16. The interior trim of claim 1, wherein the metallic component is adapted to cause induction heating of the insert for adhering the insert to the vehicle interior.

17. The interior trim of claim 15, wherein the metallic component is adapted to cause induction heating of the insert for adhering the insert to the vehicle interior.

* * * * *